Aug. 7, 1962 C. BAUGH 3,048,525
SALT COMPOSITION AND PROCESS FOR MAKING SAME
Filed Jan. 20, 1958
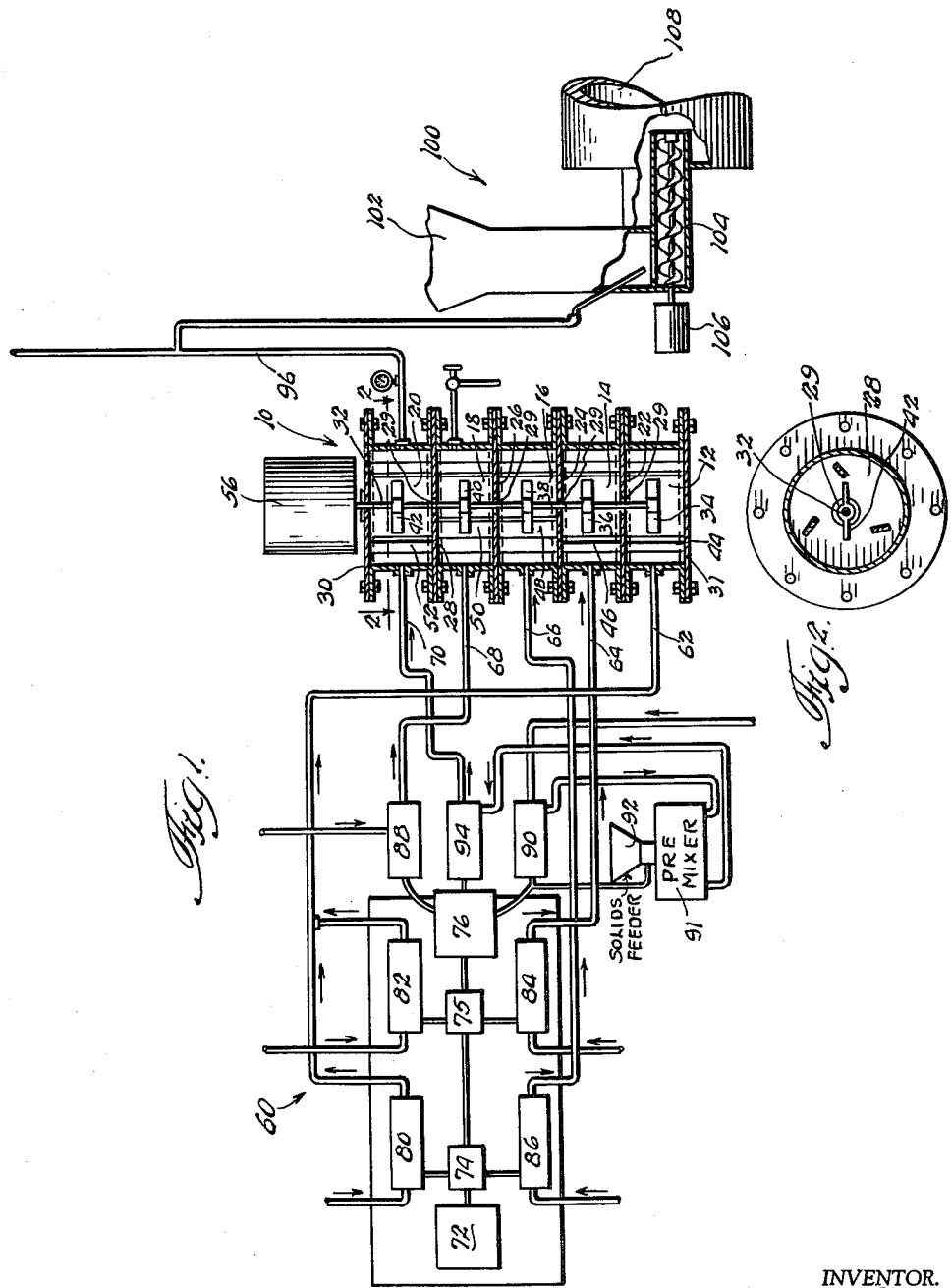
INVENTOR.
Charles Baugh.

United States Patent Office

3,048,525
Patented Aug. 7, 1962

3,048,525
SALT COMPOSITION AND PROCESS FOR MAKING SAME
Charles Baugh, 493 W. Crystal Lake Ave., Crystal Lake, Ill.
Filed Jan. 20, 1958, Ser. No. 709,959
17 Claims. (Cl. 167—82)

This invention relates to a new salt composition and to a novel process by means of which such composition may be prepared.

In combating malaria in the past, the various antimalarial therapeutic agents have been administered orally in the form of pills and tablets. Hesitancy and even refusal by those to whom the drug should be administered has been encountered, and it has been proposed recently that various advantages may be obtained from the standpoint of acceptance if a satisfactory preparation could be developed for administering the antimalarial as a food additive. One type of product to which particular attention has been given in this connection has been table salt, for salt is a universally accepted food additive and it is used in relatively uniform quantities by most persons.

Various unsuccessful attempts have been made at preparing a satisfactory salt and antimalarial composition. In the formulation and preparation of such a composition there are four major requirements which must be met. First, the mixture must be homogeneous. Many of the therapeutic agents which are used as antimalarials are quite active, being effective in rather small dosages. It is therefore important that the salt and antimalarial do not separate and segregate such as is the tendency under the conditions normally encountered in handling and shipping. Such separation and segregation could seriously alter the formulation and a large quantity of the salt could contain somewhat less than the therapeutic quantity of the drug which is needed to prevent the development of malaria. It is also possible that a small amount of salt might contain an excessive or even a hazardous amount of the drug.

A second requirement for such a composition is the protection thereof from the agglomerating and caking effects of humid atmospheres. Since the salt is to be used chiefly in areas where there is high humidity, this requirement cannot be minimized. The agglomeration and caking of the composition greatly affects its quality as a food additive and its consumption could thus be sufficiently reduced so that the quantity of the drug consumed would be below that required for adequate protection against malaria.

A third and more obvious requirement for the composition is that all constituent ingredients be safe for human consumption and approved by the proper governmental agencies.

A fourth requirement for the composition is that it must be inexpensive. The ingredients should be high in quality yet low in cost, and the process used in producing the composition should be safe and simple, for an involved and expensive process yields an expensive product.

Accordingly, it is one object of this invention to produce a salt and antimalarial composition which is homogeneous, pure, safe, and inexpensive, and which will satisfactorily withstand the agglomerating and caking effects of humid atmospheres.

Another object of this invention is to provide a process for coating granular table salt with an antimalarial therapeutic agent.

Another object of this invention is to provide a process for producing a slurry containing an antimalarial therapeutic agent, which slurry may be used to coat granular table salt.

A still further object is to provide a process for producing a slurry containing an anticaking agent and an antimalarial agent, which slurry may be used to coat granular table salt.

A still further object is to produce a slurry which may be coated upon granular table salt and which both protects the salt from humid atmospheres and renders the salt effective as an antimalarial when consumed in average normal amounts.

Further objects will become apparent from the following description, the accompanying drawing, and the appended claims.

In accordance with this invention, a new antimalarial therapeutic salt composition is provided by coating the salt with a suspension of an alkaline earth silicate and the antimalarial therapeutic agent. The suspension of the alkaline earth silicate may be prepared in accordance with the process disclosed in Patton and Baugh patent application Serial No. 654,925, filed April 24, 1957, entitled Method and Apparatus For Producing a Silicate Suspension. This process comprises the separate and continuous introduction into a reaction chamber of an aqueous solution of an alkali metal silicate and an aqueous solution of an alkaline earth metal chloride, violent agitation being provided within the reaction chamber. The solutions react within the chamber to produce an aqueous slurry of an alkaline earth metal silicate and an alkali metal chloride. In accordance with one embodiment of this invention, the alkaline earth metal silicate slurry is acidified, an antimalarial therapeutic agent is mixed therewith, and the slurry is then passed to a salt treating apparatus, where it is applied to the salt and the excess water is removed by drying. A product is thereby produced which is not only protected against caking under conditions of high humidity, and which is free of the tendency to segregate or dust, but also this product has therapeutic qualities useful for preventing the development of malaria. The apparatus employed in carrying out this invention includes a reactor and means for introducing the various reagent solutions into the reactor and a means for withdrawing the product from the reactor substantially at the same rate as the materials are being fed into the reactor. An agitation means provides the necessary high degree of agitation and mixing within the reactor to accomplish substantially instantaneous reaction between the alkali metal silicate and the alkaline earth metal chloride to maintain the homogeneity and fluidity of the reacted product, and to mix the antimalarial agent therewith.

For a more complete understanding of the invention, and with reference to the drawings:

FIG. 1 is a diagrammatic view taken partially in section showing the various components of the apparatus which may be used in carrying out the process in accordance with one embodiment of this invention; and FIG. 2 is a sectional view taken substantially along line 2—2 of FIG. 1.

With more particular reference to the drawings, a reactor 10 is provided which comprises a plurality of tiered cylindrical mixing chambers. In the illustrated embodiment five such chambers 12, 14, 16, 18 and 20 are provided. These chambers are separated by plates 22, 24, 26 and 28, respectively, and each plate has a central aperture 29 for restricted fluid communication between the adjacent chambers of the reactor. The top and bottom of the reactor are enclosed by plates 30 and 31, respectively.

Extending downwardly through top plate 30 and through the central apertures 29 in each of the respective chamber separating plates 22, 24, 26 and 28, is a vertical shaft 32. Turbine blades 34, 36, 38, 40 and 42 are connected to shaft 32 within chamber 12, 14, 16, 18 and 20, respectively.

A set of baffles is provided in each of the five reactor chambers, sets 44, 46, 48, 50 and 52, being disposed within reactor chambers 12, 14, 16, 18 and 20, respectively. Each set cooperates with the turbine blade in that chamber to provide the proper degree of agitation and mixing. In the illustrated apparatus each set includes four baffles which extend substantially the entire height of the chamber and are spaced from the wall thereof. The individual baffles in each set are disposed at an acute angle with respect to the radius of the chambers as best seen in FIG. 2. Thus turbine blade 34 is adapted to cooperate with baffle set 44 to provide the necessary agitation within chamber 12. In like manner blade 36 cooperates with baffle set 46 within chamber 14; blade 38 cooperates with baffle 48 within chamber 16; blade 40 cooperates with baffle 50 within chamber 18, and blade 42 cooperates with baffle 52 within chamber 20, each blade and baffle set providing the necessary agitation within the respective chamber. A motor 56 is operatively connected to the upwardly extending end of shaft 32 for rotation thereof.

The reagent materials are delivered to the reactor by means of an assembly 60 of proportioning pumps, and the reagents are delivered by various pipes to the various chambers of the reactor. As may be seen in the drawing, pipe 62 is connected to chamber 12 for the introduction of water therein. Pipe 64 is connected to chamber 14 for introducing an alkali metal silicate in this chamber. Pipe 66 connected to chamber 16 introduces an alkaline earth metal chloride into this chamber. Pipe 68 is connected to the reactor for the introduction of hydrochloric acid into chamber 18, and pipe 70 conveys the aqueous antimalarial suspension to chamber 20.

The pump assembly 60 includes a plurality of preferably positive displacement pumps (hereinafter described) which are driven by means of a variable speed type motor 72 through suitable gear reducers 74, 75 and 76. The capacities of the several pumps may be fixed to conform to the predetermined ratios of reagents to be delivered to the reactor, and thereafter by either increasing or decreasing a speed of motor 72, the output of the entire assembly 60 as well as the output of the reactor 10 may be correspondingly increased or decreased without changing the proportions of the several reagents delivered by the pumps.

In the embodiments illustrated in FIG. 1, the proportioning pump assembly includes seven pumps, 80, 82, 84, 86, 88, 90 and 94. The pump 80 is adapted to deliver water through pipe 62 to the reactor chamber 12. Proportioning pump 82 delivers a surface active agent solution, the nature of which will be subsequently described, into the water line 62 and thus the water which is delivered to chamber 12 contains an amount of surfactant which is dependent upon the delivery ratios of pumps 80 and 82. Proportioning pump 84 delivers an alkali metal silicate solution from a storage tank (not shown) to chamber 14 through pipe 64, and pump 86 delivers a chemical brine solution from a storage tank (not shown) through pipe 66 to chamber 16 of the reactor. Proportioning pump 88 delivers an acid solution from a storage tank (not shown) through pipe 68 to chamber 18. Pump 90 delivers water to a premixing chamber 91, and a solids feeder 92, which is also connected for proportional feeding to assembly 60, is adapted to deliver solid antimalarial agents to the premixing chamber 91. Pump 94 delivers the aqueous suspension of antimalarial solids from premixer 91 to chamber 20.

As described in greater detail in application Serial No. 654,925, gear reducers 74 and 75 are adjusted such that the silicate and brine solutions are delivered by pumps 84 and 86 in essentially stoichiometric proportions. The silicate is preferably sodium silicate, and the chemical brine contains alkaline earth metal chloride, preferably calcium and/or magnesium chloride. The sodium silicate reacts with the calcum and magnesium chloride as follows:

(1) $Na_2O \cdot XSiO_2 + CaCl_2 \rightarrow CaO \cdot XSiO_2 + 2NaCl$ (2) $Na_2O \cdot XSiO_2 + MgCl_2 \rightarrow MgO \cdot XSiO_2 + 2NaCl$ In this reaction the value of X is preferably approximately 3.3 for reasons described in the previously mentioned application, and the chloride and silicate reagents are delivered in substantially (i.e. ±10%) stoichiometric proportions in accordance with combined reactions 1 and 2 above. Also, as pointed out in said application, it is important that the reaction product be subjected to rapid agitation within all portions of the reactor in which the newly reacted alkaline earth metal silicate product is formed. This, as may be seen in the drawings, occurs particularly in chamber 16. Therefore in chamber 16 the agitation provided by the cooperation of turbine blade 38 with baffle set 48 is such that the reagents separately entering this chamber are essentially instantaneously completely mixed therein; instantaneously in this instance meaning in the order of less than about one second. Such agitation, in order to be efficient, should combine high hydraulic shear with good mixing efficiency.

It is preferred that the brine be as high in magnesium chloride as is feasible since magnesium silicate is in certain respects a somewhat better performer as a salt additive than is calcium silicate. A typical analysis for this brine introduced through pipe 66 may be 33% calcium chloride, 5% magnesium chloride, 5% sodium chloride and 57% water. The aqueous sodium silicate solution introduced through pipe 64 typically contains 38% solids (40–41° Baumé).

It is highly desired that the slurry discharged from the reactor 10 contain a minimum amount of water since, after this material has been applied to the salt, the combined product must be thoroughly dried. An excessive amount of water necessitates an excessive amount of drying, and the expense of drying represents a major economical factor in the over-all costs of carrying out the process. As described in said application, Serial No. 654,925, the preferred method for reducing the viscosity of the hydrous silicate product, without diluting it to an excessive extent with water, is by the use of a surface active agent such as the nonionic polyethylene glycol fatty acid esters. Of these esters polyethylene glycol monostearate, mono-oleate and monolaurate have been found to be quite satisfactory, as have polyoxyethylene sorbitan monolaurate, oleate, stearate and glyceryl monoricinoleate. Using one of these surfactants in quantity of from about ½% to about 1½% based on the weight of alkaline earth metal silicate, the solids content of the product may be maintained at or just slightly below 30%.

The antimalarial agent to be incorporated into the salt in accordance with this invention may be chloroquine, Primaquine, Daraprim, or Camoquin, or the salts thereof. Chloroquine and its salts are described in Patent No. 2,233,970, and chloroquine is the common name for 7-chloro-4(4-diethylamino-1-methylbutylamino) quinoline. Daraprim (pyrimethamine) is described in Patent No. 2,576,939 and is chemically defined as 2,4-diamino-5-(p-chlorophenyl)-6-ethylpyrimidine. Primaquine is chemically known as 8-(4-amino-1-methyl butyl amino)-6-methoxyquinoline. Camoquin (amodiaquine) is chemically defined as 7 - chloro-4-(3-diethylaminoethyl-4-hydroxyanilino)-quinoline. As will be more fully pointed out hereafter, it has been found undesirable in certain instances to introduce certain of the specified antimalarials into the silicate slurry as a free base and the salts of these bases may be preferred. Also when such salts are used it has been found to be desirable, as in the case of chloroquine diphosphate, to add acid to the silicate slurry to adjust the pH toward the acid side in order to prevent the release of free chloroquine into the slurry when the diphosphate is added thereto. Free chloroquine is not desired in the final salt product of this invention, since it has a tendency to impart a strong unpleasant odor thereto, which may be objectionable. Thus, the slurry coming from chambers 16 and 18 is normally alkaline having a pH of about 9 and it has been found that if chloroquine diphosphate is added to this alkaline slurry a phosphate salt and free chloroquine are produced.

In order to prevent this undesirable reaction from occurring the alkaline earth silicate product may be acidified before the addition of the chloroquine diphosphate. This enables the chloroquine diphosphate to remain unreacted in suspension and not only is the slurry homogeneous but the final treated salt product is essentially odorless. The acidifying agent is a nontoxic acid such as concentrated hydrochloric acid, and is suitably added in a quantity sufficient to change the pH of the alkaline earth metal silicate suspension from about 9 to about 6. Pump 88 is set to deliver the concentrated hydrochloric acid to the chamber 18 at a rate of about 1 mole of acid per mole of $Na_2O \cdot 3.3SiO_2$ delivered by pump 84 to the reaction chamber.

The concentration of chloroquine diphosphate in sodium chloride salt has been established by the United States Public Health Service at the level of 1%. This is predicated upon the fact that the normal human ingestion of salt per day is in the range of between 2 and 4 grams. Ingestion of this quantity of salt containing 1% chloroquine diphosphate has been found to provide the therapeutic quantiy of drug needed to prevent the development of malaria.

Accordingly, the solids feeder 92 is set to deliver approximately 1 pound of chloroquine diphosphate to the premixer per pound of the sodium silicate delivered by pump 84 to the reactor. The water delivered to premixer 91 by pump 90 preferably is set at the rate of 10 pounds per pound of chloroquine diphosphate. The viscosity of this aqueous suspension of chloroquine diphosphate is approximately equal to the viscosity of the alkaline earth metal silicate product within chamber 20. Thus, when the chloroquine diphosphate suspension is delivered to chamber 20, the viscosity of the material within chamber 20 will remain unchanged.

The final suspension slurry is removed through pipe 96 from chamber 20 and has a typical composition of 8.5 to 9.5 weight percent alkaline earth metal silicate, 8.5 to 9.5 weight percent chloroquine diphosphate, 8 to 10 weight percent sodium chloride, and the balance water (i.e. 71 to 75 weight percent). This slurry is used to treat salt in an amount to produce a final salt product having 1% silicate additive and 1% chloroquine diphosphate.

The ratio of the amounts of chloroquine diphosphate to the sodium silicate reagent may vary from about ⅔ pound to about 3⅓ pound of chloroquine diphosphate per pound of sodium silicate reagent depending upon the amount of calcium and magnesium silicate which is to be used to protect the final salt product. It is the practice to add the calcium and magnesium silicate to the salt such that it constitutes between 0.3 weight percent to about 1.5 weight percent of the dry salt. Inasmuch as the antimalarial salt composition is to be used generally in those geographical areas where the humidity is high, the silicate additive would be mixed with the salt in the proportions of about 1%. Inasmuch as the chloroquine diphosphate also constitutes 1% of the salt, it may be seen that the desired slurry which is to be mixed with the salt suitably contains approximately equal amounts of alkaline earth metal silicate and chloroquine diphosphate. The concentration of the surfactant may vary between 0.3% to 1.5% based upon the dry, hydrated alkaline earth silicate desiccant. The silicate-antimalarial slurry which is produced in the reactor is delivered by pipe 96 to a mixing device 100. This mixing device may include a salt hopper 102, a mixing screw 104, and a motor 106 for rotating screw 104. Salt which preferably contains less than about 3% moisture is fed through hopper 102 and the additive slurry is fed through pipe 96. The materials are mixed by screw 104 and are transported thereby to a drier 108 in which temperatures are controlled to avoid decomposition of the organic antimalarial. If desired, the amount of slurry delivered by pipe 96 may be governed by the speed of motor 72 in the proportioning pump assembly 60.

In operation, water is pumped by pump 80 into chamber 12, the water having introduced into it a quantity of surfactant by pump 82. This water passes through the aperture 29 in chamber dividing plate 22 into chamber 14, and a sodium silicate solution is fed into chamber 14 by means of proportioning pump 84. The combined water and silicate solutions are forced by the combined pressures of pumps 80 and 84 through the aperture 29 in dividing plate 24 into chamber 16. Chamber 16 is maintained under violent agitation, and the calcium-magnesium brine is fed into this chamber by pump 86 for reaction with the sodium silicate solution. The reaction in this chamber produces calcium-magnesium silicate and sodium chloride. This hydrous silicacte product passes upwardly through the aperture in plate 26 into chamber 18 to which concentrated hydrochloric acid solution is being delivered by pump 88. The acidified calcium-magnesium silicate slurry passes upwardly through the aperture 29 in plate 28 into reaction chamber 20. The antimalarial therapeutic agent, which is preferably chloroquine diphosphate, is fed into premixer 91 by a solids feeder 92. Water is also delivered into premixer 91 and the chloroquine diphosphate forms an aqueous suspension which is pumped by pump 94 into chamber 24 for mixture with the acidified calcium-magnesium silicate. This product is then withdrawn by pipe 96 and is mixed with the salt in the mixing and blending apparatus 100.

In the foregoing description the invention has been described with particular reference to chloroquine diphosphate as the additive to the slurry and the final salt product. It will also be apparent that other nontoxic salts of chloroquine may be used, such as the hydrogen halide, sulfate, acetate, lactate, citrate, tartrate, gluconate, etc. Likewise, other known antimalarials, such as Daraprim, Camoquin, or Primaquine, or their nontoxic salts, may be used, if desired. In certain instances, particularly in the case of chloroquine, it is desired that the antimalarial additive be present in the final salt product in the form of a salt of the base since the base itself may impart an undesired odor to the final product. In such cases a salt of the additive is added to the silicate slurry and it is preferred to lower the pH of the slurry from the normally alkaline side toward the acid side, thereby preventing the liberation of the free base when the salt of the antimalarial additive is added thereto. Thus the amount of acid used for this purpose and introduced through pipe 68 is regulated so that pH of the slurry (usually above pH 8.5) is reduced to a value below about 7.5 but not usually below about 5.0, since excess acid will have a tendency to dissolve or otherwise adversely affect the alkaline earth metal silicate. Thus a feature of this invention resides in the above indicated pH adjustment of the silicate slurry prior to the time that the salt of the antimalarial additive is admixed therewith.

These antimalarial and their salts are used in the concentration range of about 0.02 to about 3 percent by weight based upon the sodium chloride salt. It is preferred, however, that chloroquine, Primaquine, Camoquin, and the nontoxic salts of these materials be maintained at the concentration level of about 1 percent by weight. It is also preferred that the concentration of Daraprim and its nontoxic salts be maintained in the concentration range of about 0.02 to 0.2 percent by weight.

Also, as indicated, the amounts of silicate additive in the final salt product is preferably between about 0.3 and about 1.5 percent by weight, but may suitably be between about 0.2 and about 3.0 percent by weight.

Various modifications may be made without departing from the true spirit of the invention. In case of Daraprim it is preferable to slurry in methyl, ethyl, or isopropyl alcohol rather than water in premixer 91. The alcohol would be delivered to premixer 91 by means of pump 90. Also in the case of Daraprim the pH adjustment of silicate slurry may be omitted.

A concentrate could be prepared which would have an antimalarial concentration of up to 10 percent by weight based upon salt. This concentrate would then be mixed and blended with enough salt to yield a mixture containing between about 0.02 to about 3 percent by weight of antimalarial as therapeutically required.

The concentration of the antimalarial and subsequent dilution thereof is limited, however. It has been determined that the dilution should not be greater than about 10 or 20 to one. That is at least one crystal in every 10 to 20 crystals of the mixture should contain antimalarial. If only one in a hundred, for example, contained the antimalarial there would be a high probability of dispersing antimalarial-free salt from the shaker. Thus in the case of Daraprim, a concentrate could be prepared containing 0.5 to 1.0 percent Daraprim which would be subsequently mixed and blended with 9 to 19 parts of Daraprim-free salt.

Although the antimalarial agent may be thus concentrated, it is not considered good practice to increase the silicate desiccant concentration proportionally because of the "bulking" effect. This "bulking" effect tends to increase segregation and therefore should be avoided. It is preferable to treat the diluent salt separately with a suitable alternate desiccant prior to blending with the concentrate. To insure good results, in terms of nonsegregating blends, it is preferred that the particle size distribution of the salt employed in making the concentrate be very nearly the same as that employed for dilution. It is equally desirable that the same crystalline shape be employed, i.e. cubic vacuum pan salt should be blended with cubic vacuum pan salt, solar salt with solar salt, and crushed rock salt with crushed rock salt.

The treated salt product is completely homogeneous, the silicate antimalarial coating being very adherent. The silicate protects the product from the humidity and the product is entirely safe for human consumption, the constituents thereof having the approval of the Pure Food and Drug Administration. The product is inexpensive and yet it is very high in quality as a food and as a therapeutic agent.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A process for producing an anticaking antimalarial granular salt composition which comprises forming an aqueous suspension of an alkaline earth metal silicate, mixing a substance containing an antimalarial into the slurry, mixing the resultant slurry into a quantity of salt, and subsequently removing the water from the mixture by drying whereby the antimalarial and alkaline earth metal silicate are coated upon the granular salt.

2. The process recited in claim 1 in which the antimalarial is present in the salt composition in an amount of between 0.02 to about 3.0 percent by weight, and the silicate is present in an amount of between about 0.2 to about 3.0 percent by weight.

3. The process recited in claim 1 in which the antimalarial is a material containing chloroquine and is present in an amount of between 0.2 to about 3.0 percent by weight.

4. The process recited in claim 1 in which the antimalarial is a material containing Primaquine and is present in an amount of between 0.2 and 3.0 by weight.

5. The process recited in claim 1 in which the antimalarial is a material containing Camoquin and is present in an amount of between 0.2 and about 3.0 percent by weight.

6. The process recited in claim 1 in which the antimalarial is a material containing Daraprim and is present in an amount of between 0.02 and about 0.2 percent by weight.

7. The process recited in claim 1 wherein said antimalarial compound is selected from the group consisting of chloroquine, Primaquine, Camoquin, Daraprim, and the salts thereof.

8. A process for producing an anticaking antimalarial granular salt composition which comprises mixing granular salt with an acidified aqueous suspension of an alkaline earth metal silicate and chloroquine diphosphate, and subsequently removing the water from the mixture by drying whereby the chloroquine diphosphate and alkaline earth metal silicate are coated upon the granular salt.

9. The process for producing an antimalarial granular salt composition which comprises mixing the salt with an acidified siliceous aqueous suspension of chloroquine diphosphate and subsequently removing the water from the product by drying.

10. A process for producing a slurry for use in coating granular sodium chloride which includes forming an aqueous alkaline suspension of an alkaline earth metal silicate, acidifying this suspension to a pH value between about 7.5 and 5.0, and adding to the acidified suspension a salt of an organic antimalarial compond.

11. A process for producing an anticaking antimalarial granular salt composition which comprises forming an aqueous medium containing an alkaline earth metal silicate and an antimalarial, mixing said aqueous medium with a quantity of salt, whereby the antimalarial and the alkaline earth metal silicate are coated upon the granular salt, and subsequently removing the water from the coated salt product by drying.

12. A process for producing an anticaking antimalarial granular salt composition which comprises independently and continuously introducing aqueous solutions of an alkali metal silicate and an alkaline earth metal chloride into a reaction chamber in substantially stoichiometric proportions, maintaining violent agitation and high shear within the reaction chamber while the reagent solutions are being introduced, withdrawing the slurry product from the reaction chamber at substantially the same rate as the total feed rate, acidifying the slurry product to a pH value between 5.0 and 7.5, mixing into the acidified slurry product a substance containing a salt of chloroquine, mixing the resultant slurry into a quantity of granular salt, whereby the antimalarial and the slurry product are coated upon the granular salt, and subsequently removing the water from the coated salt by drying.

13. A process for producing an anticaking antimalarial granular sodium chloride composition which comprises independently and continuously introducing aqueous reagent solutions of an alkali metal silicate and an alkaline earth metal chloride into a reaction chamber in substantially stoichiometric proportions, maintaining violent agitation and high shear in the reaction chamber while the reagent solutions are being introduced, acidifying the product to a pH of about 6, mixing into the acidified product a substance containing chloroquine diphosphate, mixing the resultant slurry into a quantity of granular sodium chloride salt, whereby the antimalarial is coated upon the granular salt, and subsequently removing water from the coated salt by drying.

14. A process for producing an anticaking antimalarial granular sodium chloride composition which comprises independently and continuously introducing aqueous solutions of an alkali metal silicate and an alkaline earth metal chloride into a reaction chamber in the molar ratio of 1 mole of chloride to about 3.3 moles of silicate, maintaining violent agitation and high shear in the reaction chamber while the reagent solutions are being introduced, adding to the slurry product hydrochloric acid in the amount to adjust the pH of the slurry to a value below 7.5, mixing into the resultant product an aqueous slurry containing chloroquine diphosphate in a ratio of about ⅔ to about 3⅓ pounds per pound of alkali metal silicate delivered to the reaction chamber, mixing the resultant slurry into a quantity of granular sodium chloride salt, whereby the chloroquine diphosphate is coated upon the granular salt, and subsequently removing the water from the coated salt by drying.

15. A composition for use in coating granular table salt comprising an aqueous suspension of an alkaline earth metal silicate and an organic antimalarial selected from the group consisting of chloroquine, primaquine, amodiaquine, pyrimethamine, and the nontoxic salts thereof.

16. Granular sodium chloride having a strongly adherent coating of a gelatinous alkaline earth metal silicate and a material selected from the group consisting of chloroquine, pyrimethamine, amodiaquine, primaquine, and the nontoxic salts thereof.

17. A composition consisting essentially of dry granular table salt having admixed therewith between about 0.2 and about 3.0 percent by weight of an alkaline earth metal silicate and between about 0.02 and about 3.0 percent by weight of an antimalarial selected from the group consisting of chloroquine, primaquine, amodiaquine, pyrimethamine, and the nontoxic salts thereof.

References Cited in the file of this patent

UNITED STATES PATENTS

| | | |
|---|---|---|
| 379,299 | Weld | Mar. 13, 1888 |
| 1,999,210 | Rembert | Apr. 30, 1935 |
| 2,292,199 | Carter | Aug. 4, 1942 |
| 2,370,200 | Shabaker | Feb. 27, 1945 |
| 2,762,746 | Barnett | Sept. 11, 1956 |
| 2,768,898 | Waldo | Oct. 30, 1956 |
| 2,768,899 | Waldo | Oct. 30, 1956 |
| 2,955,956 | Baugh et al. | Oct. 11, 1960 |

FOREIGN PATENTS

| | | |
|---|---|---|
| 529,442 | Canada | Aug. 21, 1956 |

OTHER REFERENCES

Pinotti, M.: A new Method of Malaria Prophylaxis: The Addition of an Antimalarial Drug to Cooking Salt used in the Daily preparation of Food; English summary follows Portugese text. Rev. Brasileira Malariologia, Rio de Janeiro, Brazil, January 1954, vol. 6, No. 1, pp. 5–12; abstracted in Trop. Dis. Bull., vol. 52, pp. 10–12 (1955).

Dr. Albert Schweitzer: "Briefe aus dem Lambarenespital" (Letters from the Lambarene Hospital) in Africa, 1954, quoted in Gerson, "A Cancer Therapy," 1958, Whittier Books, Inc., New York, N.Y., pp. 153–166.